US012597671B2

(12) United States Patent
Terahara et al.

(10) Patent No.: US 12,597,671 B2
(45) Date of Patent: Apr. 7, 2026

(54) ENERGY STORAGE APPARATUS

(71) Applicant: GS Yuasa International Ltd., Kyoto (JP)

(72) Inventors: Ryoichi Terahara, Kyoto (JP); Noriyoshi Munenaga, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 681 days.

(21) Appl. No.: 17/915,950

(22) PCT Filed: Mar. 29, 2021

(86) PCT No.: PCT/JP2021/013167
§ 371 (c)(1),
(2) Date: Sep. 29, 2022

(87) PCT Pub. No.: WO2021/200772
PCT Pub. Date: Oct. 7, 2021

(65) Prior Publication Data
US 2023/0170571 A1 Jun. 1, 2023

(30) Foreign Application Priority Data

Mar. 30, 2020 (JP) ................................. 2020-061227

(51) Int. Cl.
*H01M 50/262* (2021.01)
*H01G 11/10* (2013.01)
(Continued)

(52) U.S. Cl.
CPC .......... *H01M 50/262* (2021.01); *H01G 11/10* (2013.01); *H01G 11/82* (2013.01);
(Continued)

(58) Field of Classification Search
None
See application file for complete search history.

(56) References Cited

U.S. PATENT DOCUMENTS 5,521,022 A * 5/1996 Petzl ................... H01M 50/213
429/97
5,800,942 A 9/1998 Hamada et al.
(Continued)

FOREIGN PATENT DOCUMENTS

EP 2 479 818 A1 7/2012
JP H02-121462 U 10/1990
(Continued)

OTHER PUBLICATIONS

International Search Report (ISR) (PCT Form PCT/ISA/210), in PCT/JP2021/013167, dated Jun. 8, 2021.

*Primary Examiner* — Gregg Cantelmo
(74) *Attorney, Agent, or Firm* — McGinn IP Law Group, PLLC

(57) ABSTRACT

An energy storage apparatus includes an outer case which includes a body portion which accommodates an energy storage device and a lid body which closes an opening portion of the body portion in a state of being integrally joined to the opening portion, and a restricting member. The restricting member includes an abutment portion which abuts on an upper surface of the lid body, which is a surface on a side opposite to the body portion, to restrict movement of the lid body in a direction away from the opening portion, and a fixing portion fixed to the body portion.

20 Claims, 7 Drawing Sheets

(51) Int. Cl.
    *H01G 11/82*         (2013.01)
    *H01M 50/204*     (2021.01)
    *H01M 50/233*     (2021.01)
    *H01M 50/271*     (2021.01)

(52) U.S. Cl.
    CPC ....... *H01M 50/204* (2021.01); *H01M 50/233*
            (2021.01); *H01M 50/271* (2021.01)

(56)               References Cited

U.S. PATENT DOCUMENTS

| | | |
|---|---|---|
| 2013/0192914 A1 | 8/2013 | Nakamori |
| 2014/0097641 A1* | 4/2014 | Hayano ................. B60L 3/0007 |
| | | 296/187.09 |
| 2016/0049626 A1 | 2/2016 | Yasui et al. |
| 2017/0323736 A1 | 11/2017 | Morita et al. |
| 2018/0297641 A1 | 10/2018 | Nada et al. |

FOREIGN PATENT DOCUMENTS

| | | |
|---|---|---|
| JP | H09-120809 A | 5/1997 |
| JP | 2013-157242 A | 8/2013 |
| JP | 2013-175490 A | 9/2013 |
| JP | 2013-229266 A | 11/2013 |
| JP | 2015-069763 A | 4/2015 |
| JP | 2016-100308 A | 5/2016 |
| JP | 2017-033955 A | 2/2017 |
| JP | WO2014/156022 A1 | 2/2017 |
| JP | 2018-195378 A | 12/2018 |
| JP | 2018-202970 A | 12/2018 |
| JP | 2019-003846 A | 1/2019 |
| JP | 2019-197664 A | 11/2019 |

* cited by examiner

ENERGY STORAGE APPARATUS

TECHNICAL FIELD

The present invention relates to an energy storage apparatus including an energy storage device and an outer case which accommodates the energy storage device.

BACKGROUND ART

Patent Document 1 discloses an energy storage apparatus including an energy storage device and an outer case in which the energy storage device is accommodated. In this energy storage apparatus, a recessed portion is formed on a peripheral wall of the outer case, and a reinforcing member for improving rigidity of the outer case is disposed in the recessed portion.

PRIOR ART DOCUMENT

Patent Document

Patent Document 1: JP-A-2018-195378

SUMMARY OF THE INVENTION

Problems to be Solved by the Invention

In the above-mentioned conventional energy storage apparatus, the reinforcing member is endlessly provided so as to surround four side walls of a body portion of the outer case. Accordingly, deformation of the side walls of the outer case can be suppressed. However, when the gas is released from the energy storage device disposed inside the outer case, the pressure (internal pressure) inside the outer case rapidly increases and hence, the outer case receives a force (internal pressure) from the inside. This internal pressure acts not only on the body portion of the outer case but also on a lid body which closes the opening portion of the body portion. That is, the lid body is in a state of receiving a force in a direction of being detached from the body portion from the inside. As a result, stress is likely to concentrate on a joint portion between the lid body and the body portion, and as a result, damage such as cracking may occur in the joint portion. In addition, the internal pressure received by the lid body increases as the airtightness of the outer case increases. Therefore, when the peripheral edge of the opening portion and the lid body are integrally joined by welding or the like in order to ensure airtightness at the opening portion of the body portion, the internal pressure received by the lid body tends to increase, and as a result, bending stress or tensile stress generated at the joint portion between the lid body and the body portion tends to increase. When damage such as cracking occurs in the joint portion due to such stress, gas inside the outer case leaks from an unexpected position of the outer case, which may deteriorate safety of the energy storage apparatus.

The present invention has been made by the inventor of the present application by newly focusing on the above problems, and an object of the present invention is to provide an energy storage apparatus with improved safety.

Means for Solving the Problems

An energy storage apparatus according to one aspect of the present invention includes: an outer case including a body portion which accommodates an energy storage device, and a lid body which closes an opening portion of the body portion in a state where the lid body is integrally joined to the opening portion; and a restricting member including an abutment portion which abuts on an upper surface of the lid body, the upper surface being a surface on a side opposite to the body portion, to restrict movement of the lid body in a direction away from the opening portion, and a fixing portion fixed to the body portion.

Advantages of the Invention

According to the present invention, it is possible to provide an energy storage apparatus with improved safety.

MODE FOR CARRYING OUT THE INVENTION

Figure 1:
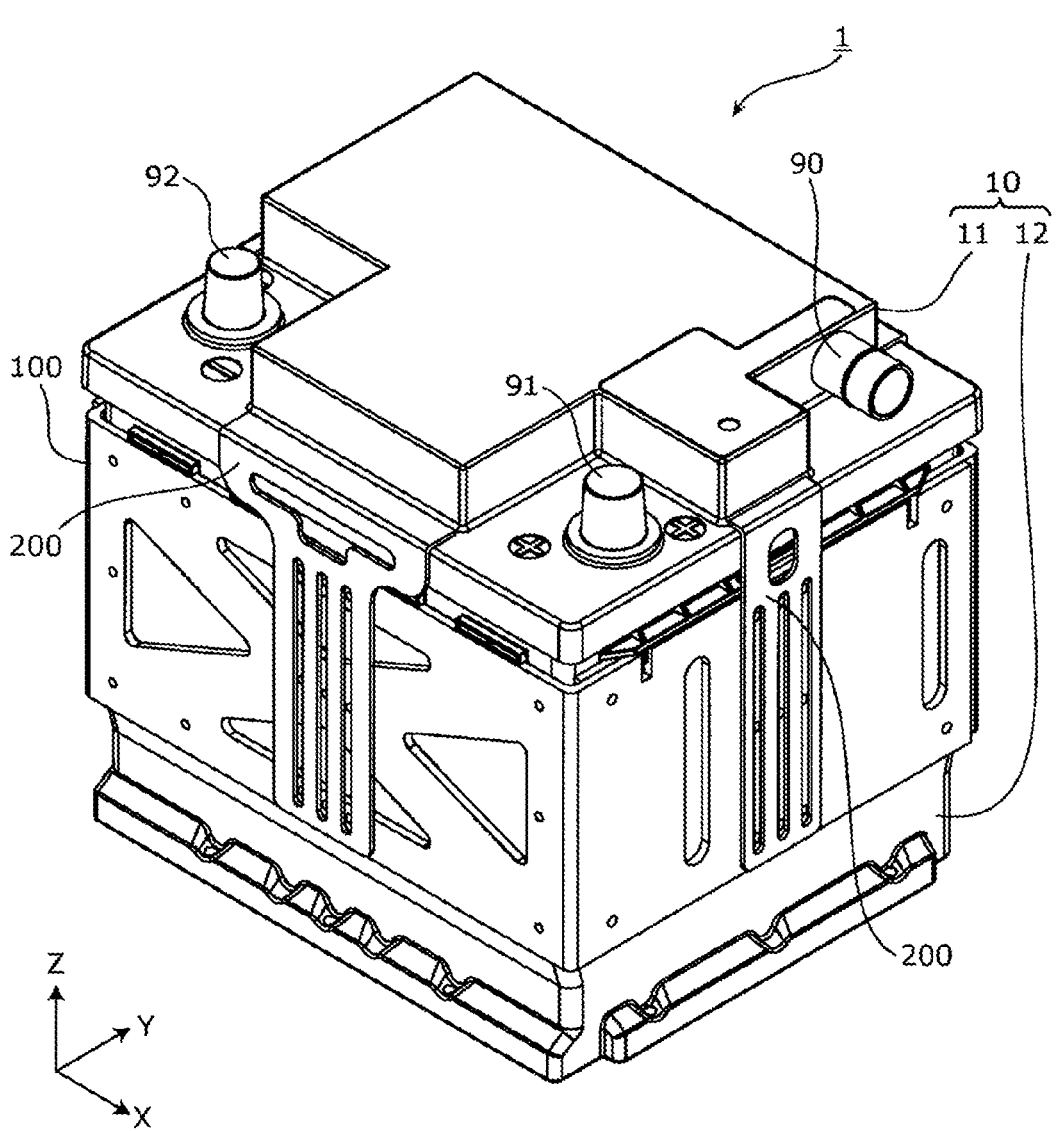
FIG. 1 is a perspective view showing an external appearance of an energy storage apparatus according to an embodiment.

An energy storage apparatus according to one aspect of the present invention includes: an outer case including a body portion which accommodates an energy storage device, and a lid body which closes an opening portion of the body portion in a state where the lid body is integrally joined to the opening portion; and a restricting member including an abutment portion which abuts on an upper surface of the lid body, the upper surface being a surface on a side opposite to the body portion, to restrict movement of the lid body in a direction away from the opening portion, and a fixing portion fixed to the body portion.

According to this configuration, since the lid body is integrally joined to the opening portion of the body portion, the outer case can ensure high airtightness at the position of the opening portion. In this case, when the gas is released from the energy storage device, the internal pressure of the outer case rapidly rises, and as a result, the lid body receives a large internal pressure which acts in a direction of being detached from the body portion. However, in the energy storage apparatus according to this aspect, when the deformation or displacement such as the expansion or the movement is about to occur in the lid body due to the increase in the internal pressure of the outer case, the abutment portion of the restricting member abuts on the upper surface of the lid body, so that the deformation or displacement of the lid body can be suppressed. Furthermore, since the restricting member is fixed to the body portion at the fixing portion, the effectiveness of the abutment portion as a retaining member or a deformation suppressing member of the lid body is ensured. As described above, according to the energy storage apparatus of this aspect, the safety can be improved.

A plurality of the energy storage devices arranged side by side in a first direction may be accommodated in the body portion, and in a top view of the lid body, the abutment portion of the restricting member may be disposed at a central portion in a second direction intersecting the first direction of an end edge portion of the lid body in the first direction.

According to this configuration, the abutment portion is disposed so as to abut on the central portion in the second direction which is most likely to swell in the end edge portion in the first direction (the end edge portion extending in the second direction) of the lid body. Therefore, the swelling (deformation) of the lid body can be more efficiently suppressed. This contributes to improvement of safety of the energy storage apparatus.

The fixing portion may extend to a position beyond a central portion of the body portion in a third direction that is an arrangement direction of the lid body and the body portion on a side of the body portion.

According to this configuration, since the fixing portion is disposed in a relatively wide range in the third direction, the fixing portion can also function as a member for protecting or reinforcing the wall portion of the body portion. This also contributes to improvement of safety of the energy storage apparatus.

The energy storage apparatus may further include a reinforcing member disposed outside a wall portion of the body portion and fixed to the body portion, and the fixing portion may be fixed to the reinforcing member.

According to this configuration, the reinforcing member can suppress swelling of the wall portion, and the restricting member can suppress deformation or displacement of the lid body. That is, by combining the restricting member and the reinforcing member, it is possible to obtain a higher reinforcing effect on the entire outer case. Accordingly, the safety of the energy storage apparatus can be further improved. Since the restricting member is directly fixed to the reinforcing member, work such as welding or fastening is easy.

The lid body and the body portion may be joined at a joint portion located at a peripheral edge of the opening portion, and at least a part of an arrangement region of the abutment portion in the top view of the lid body may overlap the joint portion.

According to this configuration, since the abutment portion is located immediately above the portion where the lid body and the body portion are joined to each other by welding, adhesion, or the like, the abutment portion can effectively suppress damage such as cracking of the joint portion. Therefore, the possibility of occurrence of gas leakage or the like inside due to damage to the joint portion is reduced. This contributes to improvement of safety of the energy storage apparatus.

The energy storage apparatus may further include a reinforcing member which is disposed outside a wall portion of the body portion, is fixed to the body portion, and is formed separately from the restricting member, and the fixing portion may extend to a position beyond a central portion of the body portion in an arrangement direction of the lid body and the body portion on a side of the body portion, and be fixed to the reinforcing member.

According to this configuration, since the restricting member and the reinforcing member are formed separately from each other (separate members), the restricting member has a high degree of freedom in shape, size, and the like, so that the restricting member can have a shape or size more suitable for position restriction of the lid body. Since the restricting member is fixed to the reinforcing member, the restricting member and the reinforcing member are structurally placed in a relationship of improving rigidity of each other. That is, by combining the restricting member and the reinforcing member, it is possible to obtain a reinforcing effect on the entire outer case. Furthermore, since the fixing portion is disposed in a relatively wide range in the height direction, the fixing portion can also function as a member which protects or reinforces the wall portion of the body portion. These facts contribute to improvement of safety of the energy storage apparatus.

Hereinafter, an energy storage apparatus according to an embodiment of the present invention (including modification examples thereof) will be described with reference to the drawings. The embodiment described below describes a comprehensive or specific example. The numerical values, shapes, materials, components, positions for arranging the components and connection forms of the components, and the like described in the following embodiment are merely examples, and are not intended to limit the present invention. In each drawing, dimensions and the like are not strictly shown.

In the following description and drawings, an arrangement direction of a plurality of energy storage devices, an opposing direction of long side surfaces of a case of the energy storage device, or a thickness direction of the case is defined as an X-axis direction. An arrangement direction of electrode terminals in one energy storage device or a facing direction of short side surfaces of a case of the energy storage device is defined as a Y-axis direction. An arrangement direction of a body portion and a lid body in an outer case of the energy storage apparatus, an arrangement direction of the energy storage device and a bus bar, or a vertical direction is defined as a Z-axis direction. The X-axis direction, the Y-axis direction, and the Z-axis direction are directions intersecting (in the following embodiment and modification examples thereof, orthogonal) each other. Although it is considered that the Z-axis direction may not be the vertical direction depending on the usage mode, the Z-axis direction will be described below as the vertical direction for convenience of description.

Hereinafter, the X-axis direction may be referred to as a first direction, and the Y-axis direction may be referred to as a second direction. Further, the Z-axis direction may be referred to as a third direction or a height direction. In the following embodiment, expressions indicating relative directions or postures, such as parallel and orthogonal, may be used, but these expressions also include cases of being not strictly the directions or postures. Two directions being parallel to each other not only means that the two directions are completely parallel to each other, but also means that the two directions are substantially parallel to each other, that is, a difference of about several percent is allowed. In the following description, an X-axis direction positive side indicates an arrow direction side of the X axis, and an X-axis direction negative side indicates a side opposite to the X-axis direction positive side. The same applies to the Y-axis direction and the Z-axis direction.

Embodiment

[1. General Description of Energy Storage Apparatus]

Figure 2:
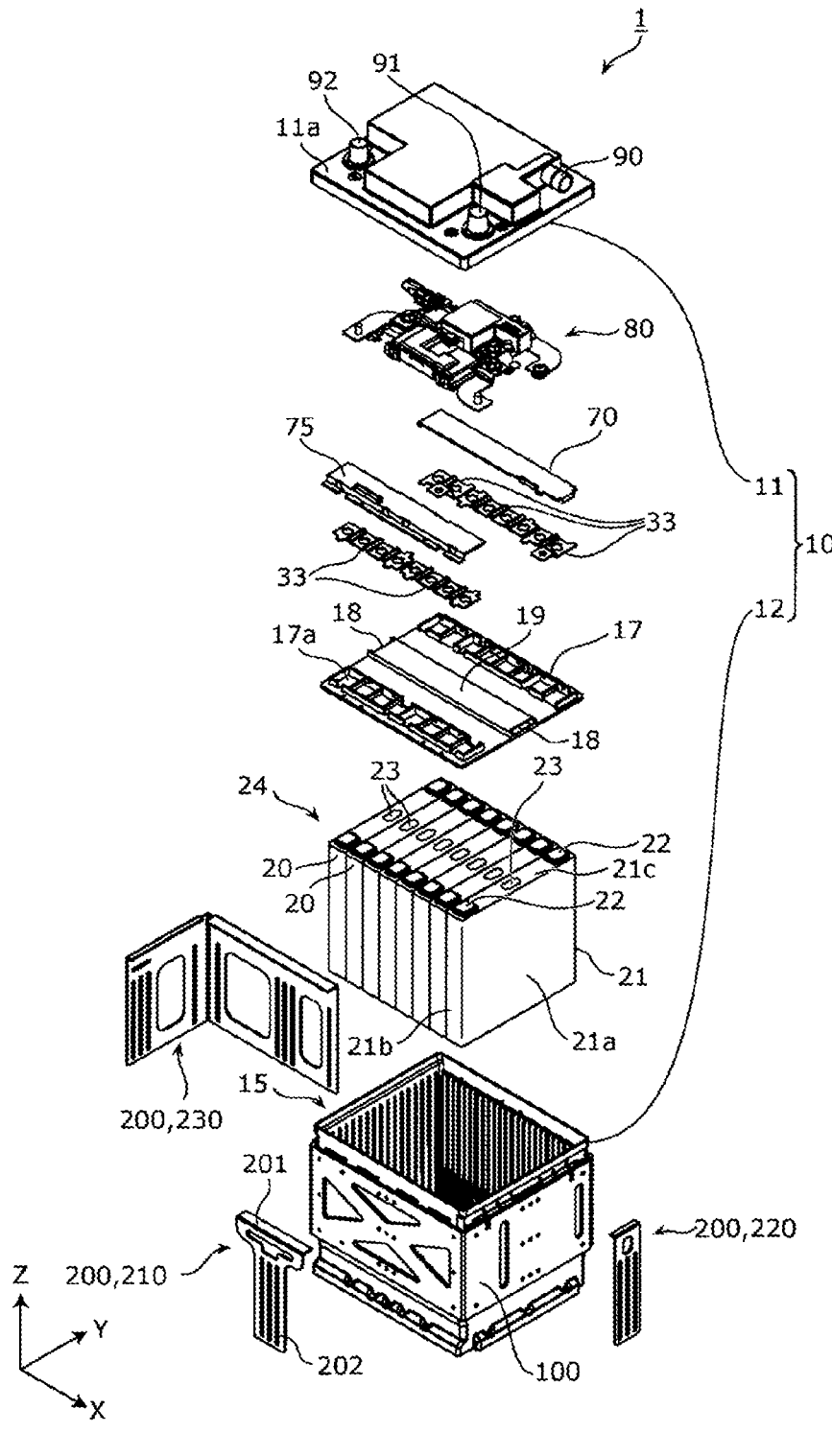
FIG. 2 is an exploded perspective view of the energy storage apparatus according to the embodiment.

First, an energy storage apparatus 1 according to an embodiment will be generally described with reference to FIGS. 1 and 2. FIG. 1 is a perspective view showing an external appearance of the energy storage apparatus 1 according to the embodiment. FIG. 2 is an exploded perspective view of the energy storage apparatus 1 according to the embodiment.

The energy storage apparatus 1 is an apparatus capable of charging electricity from the outside and discharging electricity to the outside, and has a substantially rectangular parallelepiped shape in the present embodiment. The energy storage apparatus 1 may be a battery module (assembled battery) used for power storage application, power supply application, or the like. Specifically, the energy storage apparatus 1 may be used as a battery or the like for driving or starting an engine of a moving body such as an automobile, a motorcycle, a watercraft, a ship, a snowmobile, an agricultural machine, a construction machine, or a railway vehicle for an electric railway. Examples of the automobile include an electric vehicle (EV), a hybrid electric vehicle (HEV), a plug-in hybrid electric vehicle (PHEV), and a gasoline vehicle. Examples of the railway vehicle for an electric railway include a train, a monorail, and a linear motor car. The energy storage apparatus 1 can also be used as a stationary battery or the like used for home use, a generator, or the like.

As shown in FIGS. 1 and 2, the energy storage apparatus 1 includes a plurality of energy storage devices 20, an outer case 10 which accommodates the plurality of energy storage devices 20, and a reinforcing member 100 which is attached to the outer case 10. In the present embodiment, eight energy storage devices 20 are accommodated in the outer case 10. The number of energy storage devices 20 included in the energy storage apparatus 1 is not limited to eight. The energy storage apparatus 1 only needs to include one or more energy storage devices 20. In the present embodiment, one energy storage device array 24 is formed of the plurality of energy storage devices 20 arranged in the X-axis direction. The energy storage device array 24 may include a spacer, an insulating film, and the like (not shown).

The outer case 10 includes a body portion 12 which accommodates the energy storage device array 24 and a lid body 11, and a bus bar plate 17 is disposed between the energy storage device array 24 accommodated in the body portion 12 and the lid body 11. A plurality of bus bars 33 are held on the bus bar plate 17, and the plurality of bus bars 33 are covered with bus bar covers 70 and 75. A connection unit 80 including a control circuit and the like is disposed between the bus bar plate 17 and the lid body 11.

The outer case 10 is a container (module case) having a rectangular shape (box shape) which forms an outer shell of the energy storage apparatus 1. That is, the outer case 10 is a member which fixes the energy storage device array 24, the bus bar plates 17, and the like to predetermined positions and protects these members from an impact or the like. The outer case 10 is formed of, for example, an insulating member such as polycarbonate (PC), polypropylene (PP), polyethylene (PE), polystyrene (PS), a polyphenylene sulfide resin (PPS), polyphenylene ether (PPE (including modified PPE)), polyethylene terephthalate (PET), polybutylene terephthalate (PBT), polyether ether ketone (PEEK), tetrafluoroethylene-perfluoroalkyl vinyl ether (PFA), polytetrafluoroethylene (PTFE), polyether sulfone (PES), an ABS resin, or a composite material thereof, or an insulation-coated metal.

The lid body 11 included in the outer case 10 is a rectangular member which closes an opening portion 15 of the body portion 12, and includes a positive-electrode-side external terminal 91 and a negative-electrode-side external terminal 92. The external terminals 91 and 92 are electrically connected to the plurality of energy storage devices 20 via the connection unit 80 and the bus bars 33, and the energy storage apparatus 1 charges electricity from the outside and discharges electricity to the outside via the external terminals 91 and 92. The external terminals 91 and 92 are formed of, for example, a conductive member made of metal such as aluminum or an aluminum alloy.

The lid body 11 is provided with a ventilation chamber (not shown) through which gas moving from one of the inside and the outside of the outer case 10 to the other passes, and an exhaust tube 90 that communicates the inside of the ventilation chamber with the outside of the outer case 10. The gas inside the outer case 10 is discharged to the outside of the outer case 10 through the ventilation chamber and the exhaust tube 90. More specifically, in the ventilation chamber, a valve member which is opened when the pressure (internal pressure) inside the outer case 10 increases to a predetermined value is disposed. Therefore, in a normal state, even when foreign matter such as water or dust flows into the ventilation chamber through the exhaust tube 90, the inflow of the foreign matter into the inside of the outer case 10 is substantially prevented by the valve member. When the gas is released from the energy storage devices 20 and the internal pressure of the outer case 10 becomes equal to or higher than a predetermined value, the valve member is opened and the gas inside the outer case 10 is discharged from the exhaust tube 90 to the outside of the outer case 10 through the ventilation chamber.

The body portion 12 included in the outer case 10 is a bottomed rectangular cylindrical housing (casing) in which the opening portion 15 for accommodating the energy storage device array 24 is formed. In a state where the opening portion 15 is closed by the lid body 11, the peripheral edge of the opening portion 15 and the lid body 11 are joined by, for example, thermal welding. Accordingly, airtightness in the opening portion 15 is ensured.

The energy storage device 20 is a secondary battery (battery cell) capable of charging and discharging electricity, and more specifically, is a nonaqueous electrolyte secondary battery such as a lithium ion secondary battery. The energy storage device 20 has a flat rectangular parallelepiped (prismatic) shape, and in the present embodiment, eight energy storage devices 20 are arranged in the X-axis direction as described above.

In the present embodiment, the energy storage device 20 includes a case 21 made of metal. The case 21 is a prismatic case having a pair of long side surfaces 21a facing each other and a pair of short side surfaces 21b facing each other. An electrode assembly, a current collector, an electrolyte solution, and the like are accommodated in the case 21. In the present embodiment, the plurality of energy storage devices 20 are arranged in a row in the X-axis direction in a posture where the long side surfaces 21a are directed in the X-axis direction (a posture where the short side surfaces 21b are parallel to the X-axis direction).

Electrode terminals 22 (a positive electrode terminal and a negative electrode terminal) made of metal and electrically connected to the electrode assembly inside the case 21 are provided on a lid plate 21c of the case 21. The lid plate 21c of the case 21 is further provided with a gas release valve 23 for releasing the gas inside the case 21 to the outside. The gas release valve 23 has a function of releasing (opening) the gas inside the case 21 to the outside of the case 21 when the internal pressure of the case 21 increases due to vaporization of the electrolyte solution inside the case 21. The gas release valve 23 having such a function is provided in each of the plurality of energy storage devices 20. In the present embodiment, as shown in FIG. 2, each of the plurality of energy storage devices 20 is disposed in a posture in which the gas release valve 23 is directed to the Z-axis direction positive side.

The energy storage device 20 is not limited to the non-aqueous electrolyte secondary battery, and may be a secondary battery other than the nonaqueous electrolyte secondary battery, or may be a capacitor. The energy storage device 20 may be a primary battery that can use stored electricity unless being charged by a user. In the present embodiment, the energy storage device 20 having a rectangular parallelepiped shape (prismatic shape) is shown, but the shape of the energy storage device 20 is not limited to the rectangular parallelepiped shape, and may be a polygonal columnar shape, a cylindrical shape, an oval columnar shape, or the like other than the rectangular parallelepiped shape. Further, a laminate-type energy storage device may be provided as the energy storage device 20 in the energy storage apparatus 1.

The bus bar 33 is a rectangular plate-like member which is disposed on at least two energy storage devices 20 in a state where the bus bar 33 is held on the bus bar plate 17 and electrically connects the electrode terminals 22 of the at least two energy storage devices 20 to each other. The material of the bus bar 33 is not particularly limited, and may be formed of a metal such as aluminum, an aluminum alloy, copper, a copper alloy, or stainless steel or a combination thereof, or a conductive member other than metal. In the present embodiment, by using five bus bars 33, two energy storage devices 20 are connected in parallel to form four sets of energy storage device groups, and the four sets of energy storage device groups are connected in series. The form of electrical connection of the eight energy storage devices 20 is not particularly limited, and all of the eight energy storage devices 20 may be connected in series by seven bus bars.

The connection unit 80 is a unit including a plurality of bus bars, a control board, and the like, and electrically connects the energy storage device array 24 and the external terminals 91 and 92. The control board included in the connection unit 80 includes a plurality of electric components, and a detection circuit which detects a state of each energy storage device 20, a control circuit which controls charge and discharge, and the like are formed by the plurality of electric components. In the present embodiment, the connection unit 80 is fixed to the bus bar plate 17.

The bus bar plate 17 is a resin member which holds bus bars 33. In the present embodiment, the bus bar plate 17 is a member which holds the plurality of bus bars 33, the connection unit 80, and other wirings (not shown) and performs position restriction and the like of these members. The bus bar plate 17 is provided with a plurality of bus bar opening portions 17a which hold the plurality of bus bars 33 and expose parts of the plurality of bus bars 33 to the plurality of energy storage devices 20.

In the middle of the bus bar plate 17 in the Y-axis direction, a path forming portion 19 extending in the X-axis direction and protruding toward the Z-axis direction positive side is provided along the arrangement of the gas release valves 23 of the plurality of energy storage devices 20. The path forming portion 19 covers all the gas release valves 23 from the Z-axis direction positive side. As shown in FIG. 2, path outlets 18 are provided at the end portions in the longitudinal direction of the path forming portion 19 on both the X-axis direction positive side and the X-axis direction negative side. Therefore, the gas released from the energy storage device 20 mainly passes through the path outlets 18 and is discharged to the outside of the outer case 10 through the ventilation chamber and the exhaust tube 90. The bus bar plate 17 configured as described above is fixed to the body portion 12 of the outer case 10 by a predetermined method such as adhesion or heat welding.

Each of the bus bar covers 70 and 75 is a resin member covering the plurality of bus bars 33 from above, and plays a role of electrically insulating the plurality of bus bars 33 and the connection unit 80 from each other.

The reinforcing member 100 is a member which reinforces the outer case 10. In the present embodiment, the reinforcing member 100 is disposed so as to surround the outer case 10, and when the outer case 10 is about to expand due to an increase in the internal pressure, the expansion can be suppressed.

The energy storage apparatus 1 further includes restricting members 200 fixed to the body portion 12 of the outer case 10. In the present embodiment, as shown in FIGS. 1 and 2, the plurality of restricting members 200 are fixed to the body portion 12 via the reinforcing member 100, and these restricting members 200 mainly have a function of pressing the lid body 11. The restricting member 200 includes an abutment portion 201 and a fixing portion 202. In the present embodiment, three restricting members 200 are fixed to the reinforcing member 100, and in order to distinguish these three restricting members 200, reference signs (210, 220, 230) different from each other are given as shown in FIG. 2. In the following description, the matters described for the "restricting member 200" and the components (the abutment portion 201 and the fixing portion 202) thereof are applied to each of the restricting members 210, 220, and 230. Hereinafter, the configuration of the restricting member 200 and its periphery will be further described with reference to FIGS. 3 to 7.

[2. Configuration of Restricting Member and its Periphery]

Figure 3:
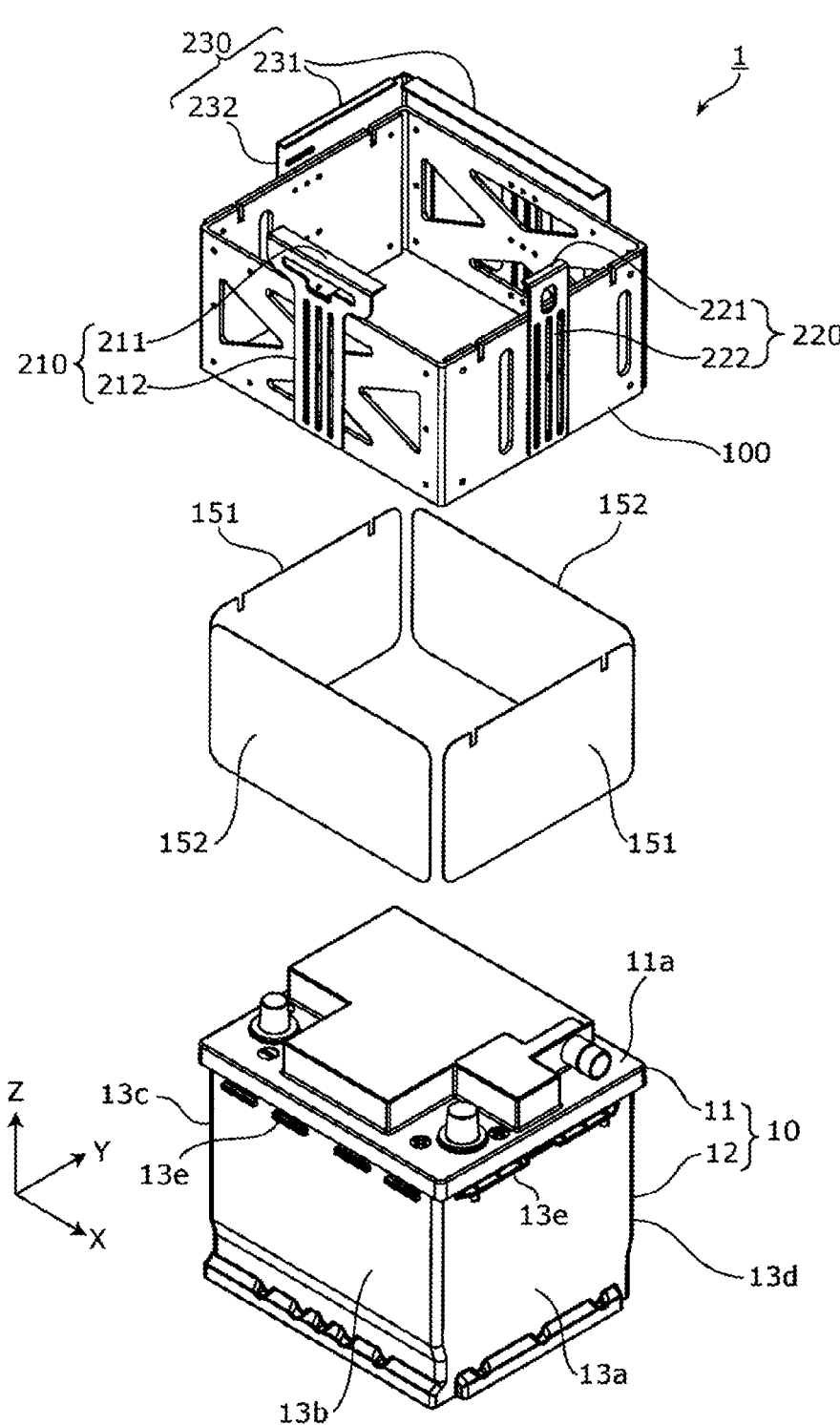
FIG. 3 is a perspective view showing a configuration of a restricting member and its periphery according to the embodiment.
Figure 4:
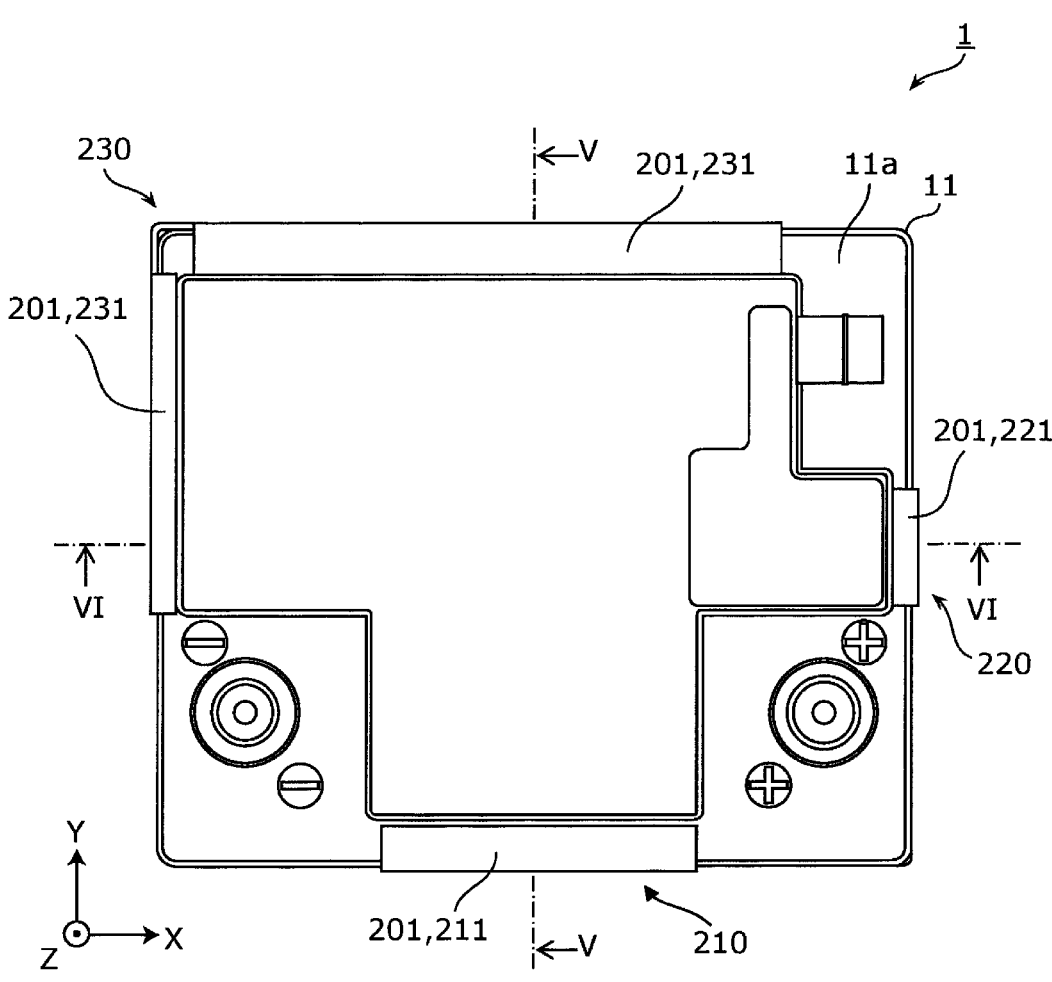
FIG. 4 is a plan view of the energy storage device according to the embodiment.
Figure 5:
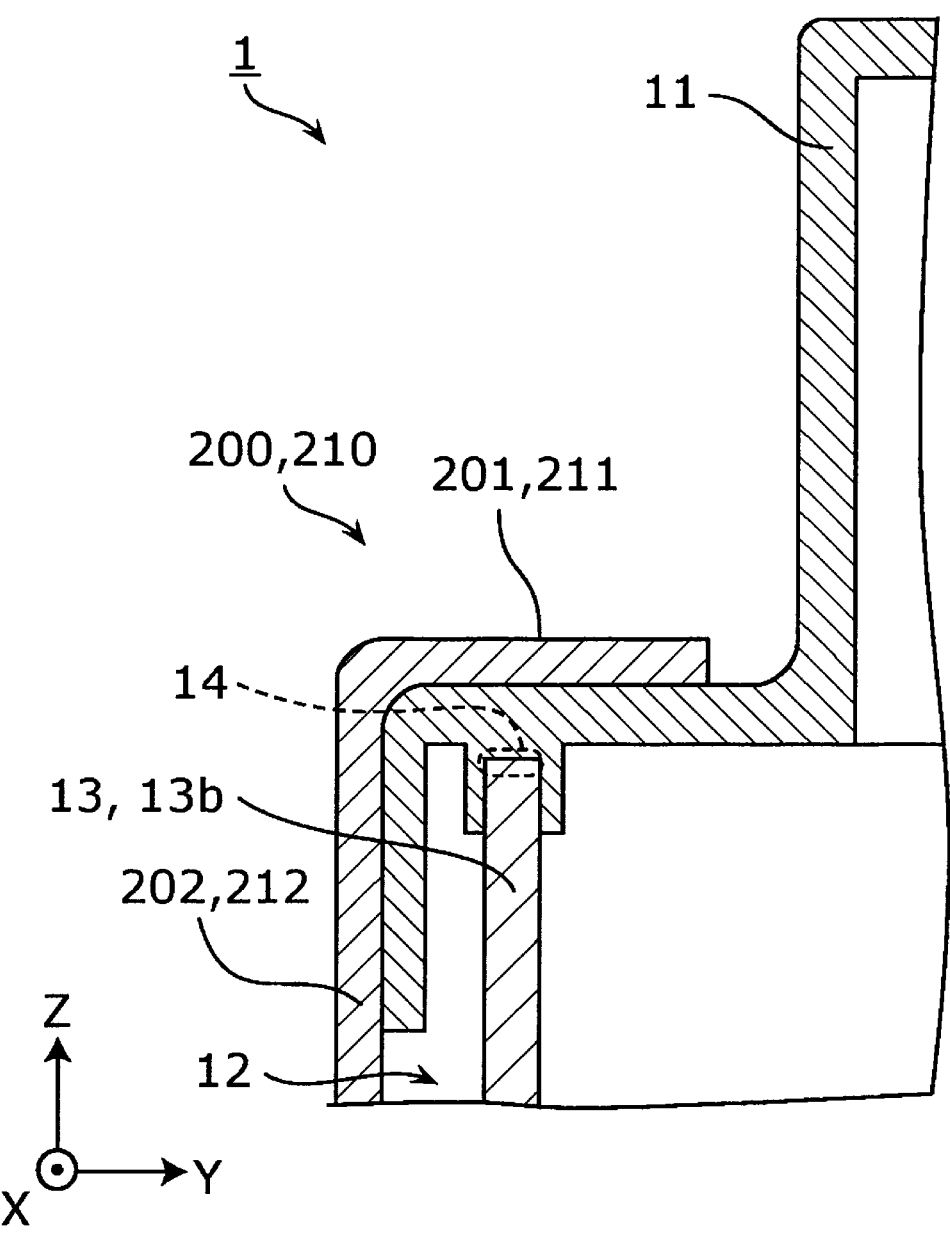
FIG. 5 is a first cross-sectional view showing a structural relationship between the restricting member and an outer case according to the embodiment.
Figure 6:
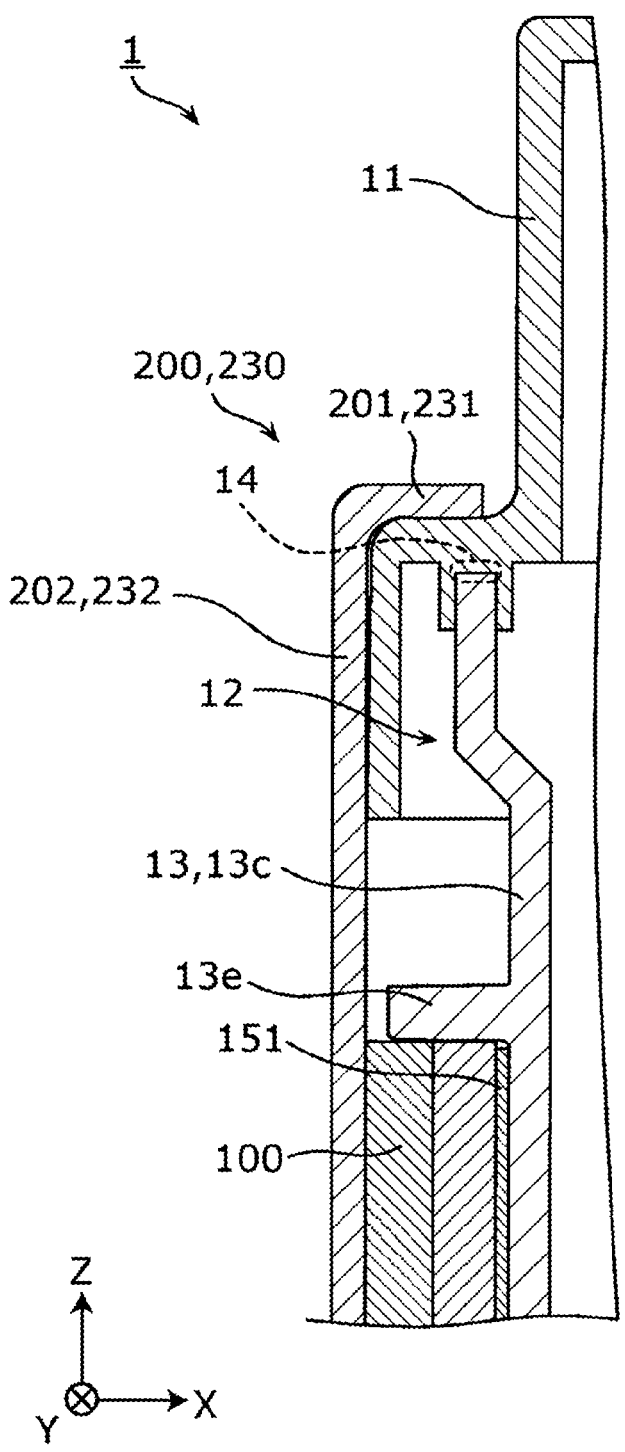
FIG. 6 is a second cross-sectional view showing a structural relationship between the restricting member and the outer case according to the embodiment.
Figure 7:
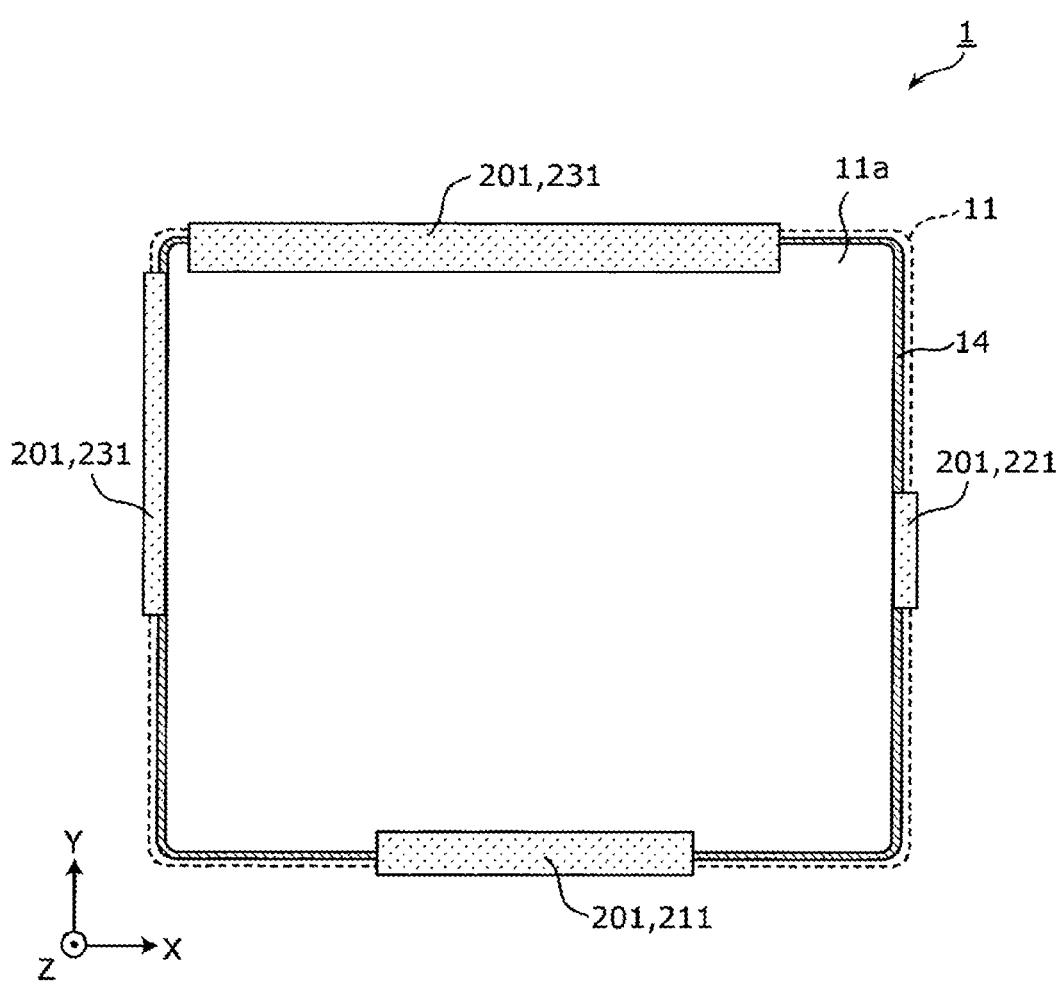
FIG. 7 is a schematic view showing a positional relationship between the restricting member and a joint portion according to the embodiment.

FIG. 3 is a perspective view showing the configuration of the restricting member 200 and its periphery according to the embodiment. FIG. 3 shows a state where the reinforcing member 100, the restricting member 200, and spacers 151 and 152 are separated from the outer case 10. FIG. 4 is a plan view (a view viewed from the Z-axis direction positive side) of the energy storage apparatus 1 according to the embodiment. FIG. 5 is a first cross-sectional view showing a structural relationship between the restricting member 200 and the outer case 10 according to the embodiment. FIG. 5 shows an end portion on the Y-axis direction negative side in the V-V cross section of FIG. 4. FIG. 6 is a second cross-sectional view showing a structural relationship between the restricting member 200 and the outer case 10 according to the embodiment. FIG. 6 shows an end portion on the X-axis direction negative side in the VI-VI cross section of FIG. 4. FIG. 7 is a schematic view showing a positional relationship between the restricting member 200 and a joint portion 14 according to the embodiment.

As shown in FIG. 2 and FIGS. 3 to 6 described above, the restricting member 200 includes the abutment portion 201 which abuts on an upper surface 11a of the lid body 11, which is a surface on a side opposite to the body portion 12, and the fixing portion 202 fixed to the body portion 12. The abutment portion 201 abuts on the upper surface 11a to restrict movement of the lid body 11 in a direction away from the opening portion 15 (see FIG. 2). The restricting member 200 is made of metal such as iron or an aluminum alloy. In the present embodiment, as shown in FIGS. 2 and 3, the energy storage apparatus 1 includes three restricting members 200 (210, 220, and 230). That is, the restricting member 210 includes an abutment portion 211 and a fixing portion 212, the restricting member 220 includes an abutment portion 221 and a fixing portion 222, and the restricting member 230 includes an abutment portion 231 and a fixing portion 232. The fixing portions 212, 222, and 232 of the three restricting members 210, 220, and 230 are fixed to the body portion 12. Specifically, the fixing portions 212, 222, and 232 are fixed to the body portion 12 via the reinforcing member 100. For this fixing, welding or fastening by bolts or rivets is used.

The abutment portion 201 may directly abut on the upper surface 11a, or may indirectly abut on the upper surface 11a with another member interposed therebetween.

The reinforcing member 100 is a member which is formed along four wall portions 13 of the outer case 10 and has an annular shape in a top view (when viewed from the Z-axis direction positive side). In the present embodiment, as shown in FIG. 3, the four wall portions 13 included in the outer case 10 are distinguished into wall portions 13a and 13c which form short side surfaces of the outer case 10 and wall portions 13b and 13d which form long side surfaces of the outer case 10. That is, the fixing portion 212 of the restricting member 210 is disposed to face the wall portion 13b. The fixing portion 222 of the restricting member 220 is disposed to face the wall portion 13a. The fixing portion 232 of the restricting member 230 is disposed to face the wall portions 13c and 13d.

Similarly to the restricting member 200, the reinforcing member 100 is a member made of metal such as iron or an aluminum alloy, and is fixed to the outer case 10 with the spacers 151 and 152 interposed between the reinforcing member 100 and the outer case 10 as shown in FIG. 3. The spacers 151 and 152 are members made of mica or resin, and are members which protect the outer case 10 from the reinforcing member 100 having higher rigidity than the outer case 10, and electrically insulate the outer case 10 and the reinforcing member 100 from each other. As the members, a mica molded article, or a resin having an electrical insulation property such as PP, PC, or PE is adopted similarly to the outer case 10.

In the present embodiment, as shown in FIG. 4, the abutment portions 201 of the plurality of restricting members 200 are disposed so as to press the peripheral edge portion of the upper surface 11a of the lid body 11 downward (toward the Z-axis direction negative side). In addition, the upper surface 11a has a substantially rectangular shape having four sides in a top view, and a range including the central portion of each of the four sides is pressed by the three restricting members 200. Therefore, even when the lid body 11 is about to be deformed or displaced so as to be detached from the body portion 12 due to an increase in the internal pressure of the outer case 10, the deformation or displacement is suppressed by the three restricting members 200.

As shown in FIGS. 5 and 6, the lid body 11 which is restricted in movement in the direction of being detached from the body portion 12 of the lid body 11 by the abutment portion 201 of the restricting member 200 is joined to the body portion 12 at the joint portion 14. As a method of this joining, a joining method that makes attachment and detachment after joining impossible (in other words, a joining method not premised on attachment and detachment), such as thermal welding or adhesion, is adopted. That is, after the lid body 11 is joined to the body portion 12, it is substantially impossible to remove the lid body 11 from the body portion 12 without breaking, damaging, or deforming at least one of the lid body 11 and the body portion 12. As shown in FIG. 7, the joint portion 14 formed by thermal welding or the like is located at the peripheral edge of the opening portion 15

(see FIG. 2) of the body portion 12. With such a configuration, the outer case 10 can ensure high airtightness at the position of the opening portion 15.

As described above, the energy storage apparatus 1 according to the present embodiment includes the outer case 10 which includes the body portion 12 which accommodates the energy storage devices 20 and the lid body 11 which closes the opening portion 15 of the body portion 12 in a state of being integrally joined to the opening portion 15, and the restricting members 200. The restricting member 200 includes the abutment portion 201 which abuts on the upper surface 11a of the lid body 11, which is a surface on the side opposite to the body portion 12, to restrict the movement of the lid body 11 in a direction away from the opening portion 15, and the fixing portion 202 fixed to the body portion 12.

According to this configuration, since the lid body 11 is integrally joined to the opening portion 15 of the body portion 12, the outer case 10 can ensure high airtightness at the position of the opening portion 15. In this case, when the gas is released from the energy storage device 20, the internal pressure of the outer case 10 rapidly rises, and as a result, the lid body 11 receives a large internal pressure which acts in a direction of being detached from the body portion 12. Specifically, when the energy storage device 20 is opened and the gas is released, the internal pressure of the outer case 10 in the airtight state or the quasi-airtight state rapidly increases. In this case, there is a case where the releasing of the gas from the exhaust tube 90 does not catch up with the increase in the internal pressure, and the internal pressure of the outer case 10 increases or the internal pressure is maintained in a high state. In this case, when the lid body 11 receives a high internal pressure, damage such as cracking may occur in the joint portion 14 which is a joint portion between the lid body 11 and the body portion 12. However, in the energy storage apparatus 1 according to the present embodiment, when the deformation or displacement such as the expansion or the movement is about to occur in the lid body 11 due to the increase in the internal pressure of the outer case 10, the abutment portion 201 of the restricting member 200 abuts on the upper surface 11a of the lid body 11, so that the deformation or displacement of the lid body 11 can be suppressed. Furthermore, since the restricting member 200 is fixed to the body portion 12 at the fixing portion 202, the effectiveness of the abutment portion 201 as a retaining member or a deformation suppressing member of the lid body 11 is ensured. As described above, according to the energy storage apparatus 1 of the present embodiment, the safety can be improved.

In the present embodiment, the plurality of energy storage devices 20 arranged side by side in the first direction (X-axis direction) are accommodated in the body portion 12. The abutment portion 201 of the restricting member 200 is disposed at a central portion in the second direction (Y-axis direction) intersecting the first direction (X-axis direction) of the end edge portion of the lid body 11 in the first direction (X-axis direction) when the lid body 11 is viewed from the upper surface 11a side.

As described above, in the present embodiment, the abutment portion 201 is disposed so as to abut on the central portion in the Y-axis direction which is most likely to swell in the end edge portion in the X-axis direction (the end edge portion extending in the Y-axis direction) of the lid body 11. Therefore, the swelling (deformation) of the lid body 11 can be more efficiently suppressed. This contributes to improvement of safety of the energy storage apparatus 1.

In the present embodiment, as shown in FIG. 1 to FIG. 3, the fixing portion 202 extends from the lid body 11 side to a position beyond a central portion in the third direction (Z-axis direction) that is an arrangement direction of the lid body 11 and the body portion 12 on a side of the body portion 12.

According to this configuration, since the fixing portion 202 is disposed in a relatively wide range in the Z-axis direction, the fixing portion 202 can also function as a member for protecting or reinforcing the wall portion 13 of the body portion 12. This also contributes to improvement of safety of the energy storage apparatus 1.

The energy storage apparatus 1 according to the present embodiment further includes the reinforcing member 100 disposed outside the wall portion 13 of the body portion 12 and fixed to the body portion 12. The fixing portion 202 is fixed to the reinforcing member 100.

According to this configuration, the reinforcing member 100 can suppress swelling of the wall portion 13, and the restricting members 200 can suppress deformation or displacement of the lid body 11. That is, by combining the restricting members 200 and the reinforcing member 100, it is possible to obtain a reinforcing effect on the entire outer case 10. Accordingly, the safety of the energy storage apparatus 1 can be further improved. In addition, since the restricting member 200 is directly fixed to the reinforcing member 100, work such as welding or fastening is easy.

Furthermore, the fixing portion 202 included in the restricting member 200 also has a function of improving rigidity of the reinforcing member 100. Specifically, as shown in FIG. 6, the fixing portion 202 is disposed outside the reinforcing member 100 and is joined to the outer surface of the reinforcing member 100 by welding or the like. Therefore, the restricting member 200 functions as a member which improves the rigidity of the reinforcing member 100 or a member which increases the thickness of the reinforcing member 100. That is, the fixing portion 202 of the restricting member 200 can improve the reinforcing function by the reinforcing member 100. As shown in FIG. 6, a rib 13e provided on the outer surface of the wall portion 13 of the body portion 12 is disposed at a position facing the upper end surface of the reinforcing member 100. Therefore, the rib 13e functions as a portion which positions the reinforcing member 100 at the time of manufacturing the energy storage apparatus 1 and also functions as a portion which restricts the movement of the reinforcing member 100 toward the upper side (the Z-axis direction positive side) at the time of using the energy storage apparatus 1. Therefore, even if the abutment portion 201 receives a large upward force, the reinforcing member 100 to which the restricting member 200 is fixed abuts on the rib 13e, so that the upward movement is substantially impossible. As a result, the abutment portion 201 can more reliably suppress deformation or displacement of the lid body 11. In FIG. 6, the reinforcing member 100 is configured by overlapping two plate-shaped members in the thickness direction, but this configuration is an example, and the reinforcing member 100 may be configured using a single material.

In the present embodiment, as shown in FIGS. 5 to 7, the lid body 11 and the body portion 12 are joined to each other at the joint portion 14 located at the peripheral edge of the opening portion 15. At least a part of the arrangement region of the abutment portion 201 when viewed from the upper surface 11a side overlaps the joint portion 14. Specifically, as shown in FIGS. 5 to 7, each of the arrangement regions of the four abutment portions 201 (the abutment portion 211, the abutment portion 221, and the two abutment portions 231) overlaps a part of the joint portion 14 in the extending direction, and overlaps all or a part of the joint portion 14 in the width direction orthogonal to the extending direction.

As described above, in the present embodiment, the abutment portion 201 is located immediately above a portion (joint portion 14) where the lid body 11 and the body portion 12 are joined to each other by welding, adhesion, or the like. Therefore, the abutment portion 201 can effectively suppress damage such as cracking of the joint portion 14. As a result, the possibility of occurrence of gas leakage or the like inside due to damage to the joint portion 14 is reduced. This contributes to improvement of safety of the energy storage apparatus 1.

Focusing on the relationship between the restricting member 200 and the reinforcing member 100, the energy storage apparatus 1 according to the present embodiment can also be described as follows. The energy storage apparatus 1 includes the reinforcing member 100 which is disposed outside the wall portion 13 of the body portion 12, is fixed to the body portion 12, and is formed separately from the restricting member 200. On the side of the body portion 12, the fixing portion 202 extends from the lid body 11 side to a position beyond a central portion in a height direction (Z-axis direction) that is an arrangement direction of the lid body 11 and the body portion 12, and is fixed to the reinforcing member 100.

According to this configuration, since the restricting member 200 and the reinforcing member 100 are formed separately from each other (separate members), a degree of freedom in shape, size, and the like of the restricting member 200 is high. Therefore, the restricting member 200 can have a shape or a size more suitable for the position restriction of the lid body 11. Further, since the restricting members 200 are fixed to the reinforcing member 100, the restricting members 200 and the reinforcing member 100 are structurally placed in a relationship of improving rigidity of each other. That is, by combining the restricting members 200 and the reinforcing member 100, it is possible to obtain a higher reinforcing effect on the entire outer case 10. Furthermore, since the fixing portion 202 is disposed in a relatively wide range in the height direction, the fixing portion 202 can also function as a member which protects or reinforces the wall portion 13 of the body portion 12. These facts contribute to improvement of safety of the energy storage apparatus.

Modification Examples

The energy storage apparatus according to the present invention has been described above based on the embodiment. However, the present invention is not limited to the above embodiment. Various modifications made by those skilled in the art to the above embodiment are also included in the scope of the present invention without departing from the gist of the present invention.

In the present embodiment, the three restricting members 200 are disposed so as to press each of the four sides of the lid body 11 in a top view, but only one side of the lid body 11 may be pressed by one restricting member 200. It is assumed that the area or the volume of the joint portion 14 is relatively small due to restrictions of the shape or the like of the body portion 12 or the lid body 11, so that the bonding force on one side of the four sides of the lid body 11 is weaker than the other side. In this case, one restricting member 200 may be disposed on the outer case 10 so as to press only the one side. As a result, the possibility of occurrence of a defect such as damage to the joint portion 14 between the lid body 11 and the body portion 12 is reduced.

In the present embodiment, the restricting member 200, which is one of the three restricting members 230, is configured to press two adjacent sides of the lid body 11 in a top view as shown in FIGS. 3 and 4. However, the restricting members 200 formed separately from each other may be respectively disposed on these two sides. That is, the shape, the number, and the arrangement layout of the restricting members 200 are not limited to the shape, the number, and the arrangement layout shown in FIGS. 1 to 7. The restricting member 200 having a shape in which the fixing portions 202 disposed outside the two wall portions 13a and 13c (see FIG. 3) are connected to each other on the bottom surface side of the body portion 12 may be fixed to the outer case 10. In this case, by performing bending processing or the like on one metal plate, it is possible to manufacture one restricting member 200 which presses two sides facing each other among the four sides of the lid body 11 in a top view. In addition, a portion of the restricting member 200 located outside the bottom surface of the body portion 12 (a connecting portion of the two fixing portions 202) functions as a portion for restricting upward movement of the two abutment portions 201. Therefore, it is possible to obtain a higher suppressing effect on the swelling (deformation) of the lid body 11 by the restricting member 200.

By forming the fixing portion 202 in a rectangular annular shape in a top view, the fixing portion 202 may be disposed so as to surround outer surfaces of the four wall portions 13 (13a to 13d) of the body portion 12, and the fixing portion 202 may have four abutment portions 201 which press the four sides of the lid body 11. That is, one restricting member 200 having the same shape as the shape (see FIG. 3) obtained by combining the reinforcing member 100 and the three restricting members 200 according to the present embodiment may be fixed to the outer case 10. In other words, the restricting member 200 and the reinforcing member 100 may not be formed separately from each other. That is, one of the restricting member 200 and the reinforcing member 100 may be integrally provided on the other.

As described above, the energy storage apparatus 1 only needs to include at least one restricting member 200, and the number of abutment portions 201 included in one restricting member 200 only needs to be one or more. Further, one abutment portion 201 only needs to be disposed so as to abut on the upper surface 11a of the lid body 11. That is, one abutment portion 201 only needs to be provided on the restricting member 200 so as to press at least a part of the upper surface 11a of the lid body 11.

Each of the reinforcing member 100 and the restricting member 200 is not necessarily made of metal. Each of the reinforcing member 100 and the restricting member 200 may be formed of a non-metallic material having high rigidity such as fiber-reinforced plastic. Accordingly, the weight of the energy storage apparatus 1 can be reduced.

The energy storage apparatus 1 may not include the reinforcing member 100. The energy storage apparatus 1 can improve safety as described above by including at least the restricting member 200 as a member which suppresses deformation or displacement of the lid body 11. When the energy storage apparatus 1 does not include the reinforcing member 100, the restricting member 200 may be fixed to the body portion 12 by fixing the fixing portion 202 to the body portion 12 by engagement, fitting, burying, adhering, welding, fastening, or the like.

A form constructed by arbitrarily combining a plurality of components described above is also included in the scope of the present invention.

INDUSTRIAL APPLICABILITY

The present invention can be applied to an energy storage apparatus including the energy storage device 20 such as a lithium ion secondary battery.

DESCRIPTION OF REFERENCE SIGNS

1: energy storage apparatus
10: outer case
11: lid body
11a: upper surface
12: body portion
13, 13a, 13b, 13c, 13d: wall portion
13e: rib
14: joint portion
15: opening portion
20: energy storage device
100: reinforcing member
200, 210, 220, 230: restricting member
201, 211, 221, 231: abutment portion
202, 212, 222, 232: fixing portion

The invention claimed is:
1. An energy storage apparatus comprising:
an outer case including:
  a body portion which accommodates an energy storage device; and
  a lid body which closes an opening portion of the body portion in a state where the lid body is integrally joined to the opening portion; and
a restricting member including:
  an abutment portion which abuts on an upper surface of the lid body, the upper surface being a surface on a side opposite to the body portion, to restrict movement of the lid body in a direction away from the opening portion; and
  a fixing portion fixed to the body portion,
wherein the lid body includes a raised portion in the upper surface, and
wherein the abutment portion is provided only in area corresponding to a side of the raised portion.
2. The energy storage apparatus according to claim 1, wherein a plurality of the energy storage devices arranged side by side in a first direction are accommodated in the body portion, and
wherein, in a top view of the lid body, the abutment portion of the restricting member is disposed at a central portion in a second direction intersecting the first direction of an end edge portion of the lid body in the first direction.
3. The energy storage apparatus according to claim 1, wherein the fixing portion extends to a position beyond a central portion of the body portion in a third direction that is an arrangement direction of the lid body and the body portion on a side of the body portion.
4. The energy storage apparatus according to claim 1, further comprising a reinforcing member disposed outside a wall portion of the body portion and fixed to the body portion,
wherein the fixing portion is fixed to the reinforcing member.
5. The energy storage apparatus according to claim 1, wherein the lid body and the body portion are joined at a joint portion located at a peripheral edge of the opening portion, and wherein at least a part of an arrangement region of the abutment portion in the top view of a lid plate overlaps the joint portion.

6. The energy storage apparatus according to claim 1, further comprising a reinforcing member which is disposed outside a wall portion of the body portion, is fixed to the body portion, and is formed separately from the restricting member, wherein the fixing portion extends to a position beyond a central portion of the body portion in an arrangement direction of the lid body and the body portion on a side of the body portion, and is fixed to the reinforcing member.

7. The energy storage apparatus according to claim 1, wherein the restricting member comprises a plurality of restricting members, each including a respective abutment portion and a respective fixing portion, and wherein, in a top view of the lid body, the abutment portions of the plurality of restricting members are disposed to press a peripheral edge portion of the upper surface of the lid body at central portions of at least three sides of the lid body.

8. The energy storage apparatus according to claim 7, wherein one of the plurality of restricting members includes a single abutment portion configured to press central portions of two adjacent sides of the lid body in the top view.

9. The energy storage apparatus according to claim 1, further comprising a ventilation chamber disposed in the lid body, the ventilation chamber configured to allow gas to pass from inside the outer case to outside the outer case, and an exhaust tube communicating the ventilation chamber with the outside of the outer case, wherein the abutment portion is positioned to avoid overlapping the ventilation chamber in a top view of the lid body.

10. The energy storage apparatus according to claim 1, wherein the fixing portion of the restricting member is fixed to the body portion via a reinforcing member, and wherein a spacer is interposed between the reinforcing member and an outer surface of the body portion, the spacer being formed of an electrically insulating material.

11. The energy storage apparatus according to claim 10, wherein the spacer comprises a material selected from the group consisting of mica, polypropylene, polycarbonate, and polyethylene.

12. The energy storage apparatus according to claim 1, wherein the body portion includes a plurality of wall portions, and a rib is provided on an outer surface of at least one of the wall portions, the rib configured to position a reinforcing member fixed to the body portion and to restrict movement of the reinforcing member toward the lid body.

13. The energy storage apparatus according to claim 1, wherein the energy storage device comprises a plurality of energy storage devices arranged in a first direction, each energy storage device including a gas release valve directed toward the lid body, and wherein the abutment portion is positioned to avoid overlapping the gas release valves in a top view of the lid body.

14. The energy storage apparatus according to claim 1, wherein the restricting member is formed of a metal material, and the fixing portion is joined to a reinforcing member by welding or fastening.

15. The energy storage apparatus according to claim 1, wherein the lid body and the body portion are joined at a joint portion by thermal welding, and wherein the abutment portion overlaps an entire width of the joint portion in a direction orthogonal to an extending direction of the joint portion in a top view of the lid body.

16. The energy storage apparatus according to claim 1, wherein the restricting member is configured such that the fixing portion extends along at least two non-adjacent wall portions of the body portion, and the abutment portion presses at least two non-adjacent sides of the lid body in a top view.

17. The energy storage apparatus according to claim 1, further comprising a bus bar plate disposed between the energy storage device and the lid body, the bus bar plate including a path forming portion extending along an arrangement of gas release valves of a plurality of energy storage devices, wherein the abutment portion is positioned to avoid overlapping the path forming portion in a top view of the lid body.

18. The energy storage apparatus according to claim 1, wherein the outer case is formed of an insulating material selected from the group consisting of polycarbonate, polypropylene, polyethylene, and a polyphenylene sulfide resin, and wherein the restricting member is configured to enhance rigidity of the outer case when an internal pressure of the outer case increases.

19. An energy storage apparatus comprising:
an outer case including:
a body portion which accommodates an energy storage device; and
a lid body which closes an opening portion of the body portion in a state where the lid body is integrally joined to the opening portion;
a restricting member including:
an abutment portion which abuts on an upper surface of the lid body, the upper surface being a surface on a side opposite to the body portion, to restrict movement of the lid body in a direction away from the opening portion; and
a fixing portion fixed to the body portion; and
a reinforcing member disposed outside a wall portion of the body portion and fixed to the body portion,
wherein the fixing portion is fixed to the reinforcing member,
wherein the body portion includes four side surfaces and one bottom surface, the bottom surface being located on an opposite side of the lid body, and
wherein the reinforcing member is formed on different side surfaces of the four side surfaces of the body portion and formed integrally with the different side surfaces of the body portion.

20. An energy storage apparatus comprising:
an outer case including:
a body portion which accommodates an energy storage device; and
a lid body which closes an opening portion of the body portion in a state where the lid body is integrally joined to the opening portion; and
a restricting member including:
an abutment portion which abuts on an upper surface of the lid body, the upper surface being a surface on a side opposite to the body portion, to restrict movement of the lid body in a direction away from the opening portion; and
a fixing portion fixed to the body portion;

a reinforcing member disposed outside a wall portion of the body portion and fixed to the body portion; and a spacer interposed between the reinforcing member and the outer case wherein the fixing portion is fixed to the reinforcing member.

* * * * *